(12) United States Patent
Mook et al.

(10) Patent No.: US 9,566,647 B1
(45) Date of Patent: Feb. 14, 2017

(54) DIRECT METAL ELECTROPHOTOGRAPHY ADDITIVE MANUFACTURING MACHINE

(71) Applicant: General Electric Company, Schenectady, NY (US)

(72) Inventors: Joshua Tyler Mook, Loveland, OH (US); William Thomas Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/956,942

(22) Filed: Dec. 2, 2015

(51) Int. Cl.
*B29C 35/08* (2006.01)
*B29C 41/02* (2006.01)
*B22F 3/105* (2006.01)
*B33Y 30/00* (2015.01)
*B33Y 50/02* (2015.01)

(52) U.S. Cl.
CPC ...... *B22F 3/1055* (2013.01); *B22F 2003/1056* (2013.01); *B22F 2003/1057* (2013.01); *B33Y 30/00* (2014.12); *B33Y 50/02* (2014.12)

(58) Field of Classification Search
CPC .......... B29C 35/08; B29C 41/02; B29C 67/00; B29C 67/0092; B29C 67/0074
USPC ................................... 425/78, 375
See application file for complete search history.

(56) References Cited

U.S. PATENT DOCUMENTS

| | | |
|---|---|---|
| 4,444,858 A | 4/1984 | Nishibu et al. |
| 8,879,957 B2 | 11/2014 | Hanson et al. |
| 9,029,058 B2 | 5/2015 | Martin |
| 9,144,940 B2 * | 9/2015 | Martin ................ B29C 67/0092 |
| 2006/0188800 A1 | 8/2006 | Magome et al. |
| 2013/0252160 A1 | 9/2013 | Nagayama et al. |
| 2013/0272746 A1 | 10/2013 | Hanson et al. |
| 2015/0016841 A1 | 1/2015 | Hanson et al. |
| 2015/0024169 A1 | 1/2015 | Martin |
| 2015/0024309 A1 | 1/2015 | Martin |
| 2015/0024316 A1 | 1/2015 | Orrock et al. |

(Continued)

FOREIGN PATENT DOCUMENTS

WO WO2015/009790 A1 1/2015

OTHER PUBLICATIONS

Non-Final office Action Issued in Connection with related U.S. Appl. No. 14/956,896 on Dec. 1, 2016.

*Primary Examiner* — Joseph S Del Sole
*Assistant Examiner* — Thukhanh T Nguyen
(74) *Attorney, Agent, or Firm* — General Electric Company; Brian P. Overbeck

(57) ABSTRACT

An additive manufacturing system for printing a three-dimensional part is provided. The additive manufacturing system can include a mobile housing defining a front housing section and rear housing section; a photoreceptor drum defining a drum outer surface; a charging electrode positioned to apply electrostatic charge to the photoreceptor drum outer surface; a laterally stationary platform disposed outside the mobile housing adjacent the workpart and having at least one charged transfer electrode; a controller circuit for traversing the mobile housing about the workpart while selectively applying at least one laser diode emission onto the photoreceptor drum to expose a layer definition on the photoreceptor drum outer surface; front and rear microwave emitters disposed inside the mobile housing for fusing the respective metal print layers; and front and rear induction coils disposed inside the mobile housing for heating the workpart.

19 Claims, 3 Drawing Sheets

(56) References Cited

U.S. PATENT DOCUMENTS

2015/0024317 A1   1/2015  Orrock et al.
2015/0024319 A1   1/2015  Martin
2015/0273582 A1* 10/2015  Crump ................ B29C 67/0055
                                                    425/78

* cited by examiner

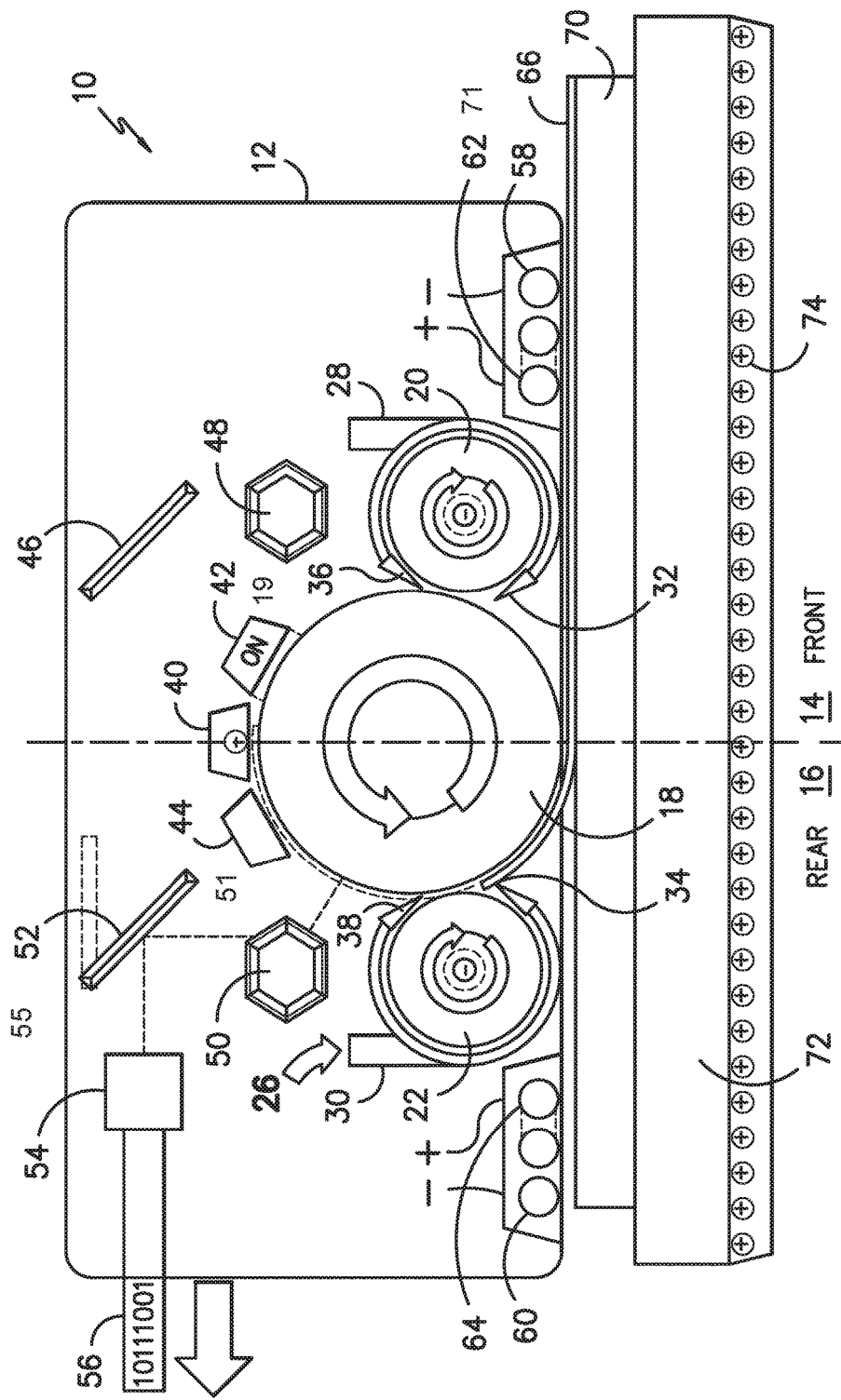
FIG. -1-

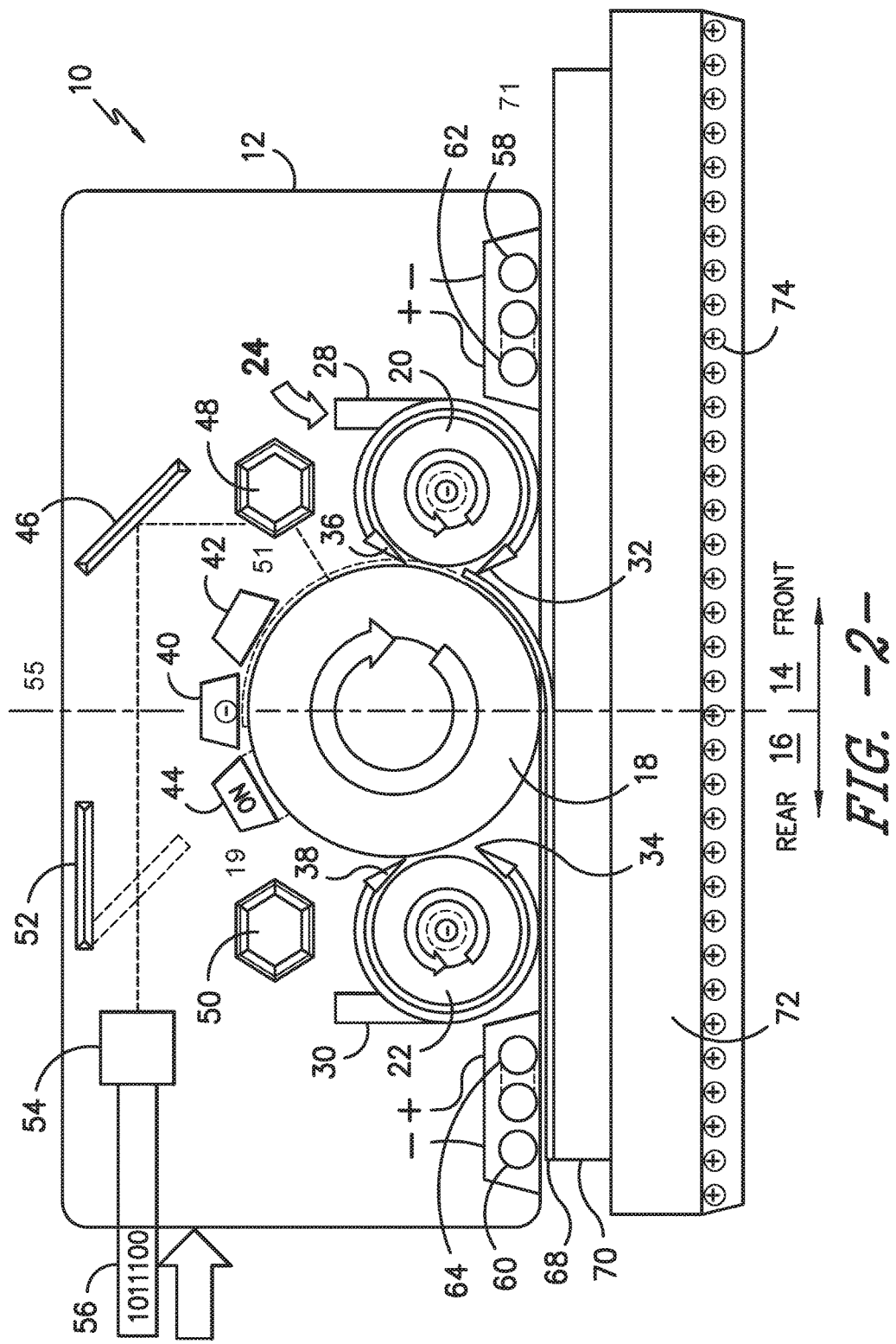
FIG. -2-

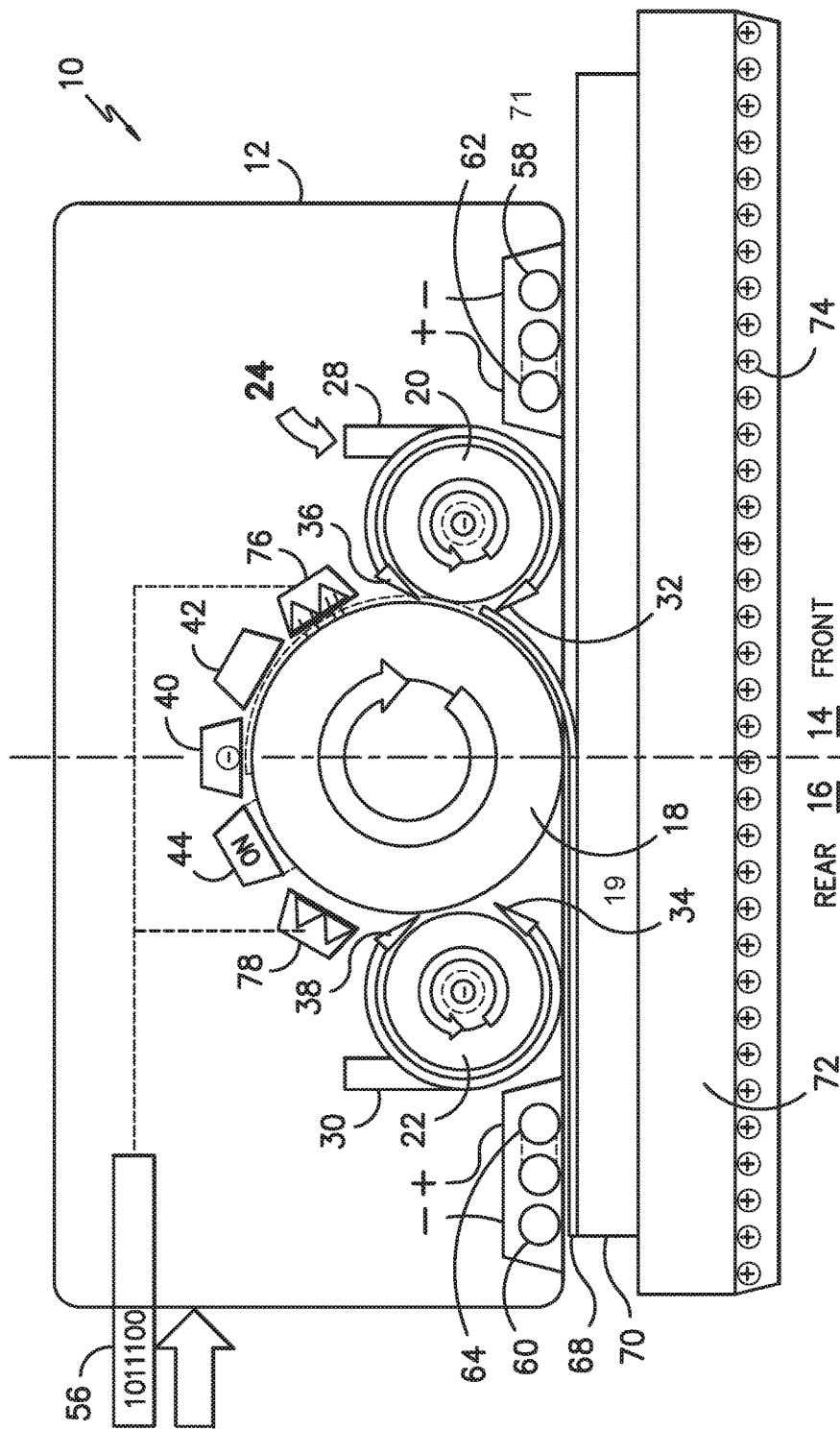
FIG. -3-

DIRECT METAL ELECTROPHOTOGRAPHY ADDITIVE MANUFACTURING MACHINE

FIELD OF THE INVENTION

The present subject matter relates generally to additive manufacturing systems and methods for building three-dimensional (3D) parts. In particular, the present disclosure relates to systems and processes for building 3D parts with direct metal electrophotography-based systems (DME) and/or ionography-based systems using metallic build materials.

BACKGROUND OF THE INVENTION

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, direct metal laser melting (DMLM), and stereolithographic processes. For each of these techniques, the digital representation of the 3D part is initially sliced into multiple horizontal (X-Y) layers. For each sliced layer, a tool path is then generated, which provides instructions for the particular additive manufacturing system to form the given layer.

Current powder bed DMLM machines are fraught with limitations, especially those preventing large-size scalable systems, the limitations including but not limited to speed, powder volume, trapped powder, and thermal stresses. Speed limitations include recoating and laser scan times that are too slow. Current processes are essentially 1-D (point melting) repeated in X-Y space and then repeated in Z space. Typical layers require 300 seconds of laser time followed by 10 seconds of recoat time. Powder volume limitations exist because every nook and cranny of the build cube must be filled with powder requiring large volumes of powder charges which must be dealt with during and after build. For large area builds, this powder charge could be thousands of pounds. Also, trapped powder limitations occur because closed volumes are impossible to build as the powder cannot be evacuated. The current requirement to evacuate powder also limits design freedom. And, current DMLM machines impose large thermal stresses on parts resulting from rapid build material solidification thereby creating geometrical distortions and sometimes cracking in the parent material. In addition, the entire platform must be stress relieved prior to cut-off which is difficult for large parts due to the heavy loads and size limitations of commonly accessible furnaces.

In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

However, a need exists for improved printing techniques for 3D printing, particularly with metal build materials.

BRIEF DESCRIPTION OF THE INVENTION

Aspects and advantages of the invention will be set forth in part in the following description, or may be obvious from the description, or may be learned through practice of the invention.

An additive manufacturing system is generally provided for printing a three-dimensional part. In one embodiment, the additive manufacturing system includes a mobile housing defining a front housing section and rear housing section; a photoreceptor drum defining a drum outer surface; a charging electrode positioned to apply electrostatic charge to the photoreceptor drum outer surface; a laterally stationary platform disposed outside the mobile housing adjacent the workpart, the laterally stationary platform comprising at least one charged transfer electrode; a controller circuit for traversing the mobile housing about the workpart while selectively applying at least one laser diode emission onto the photoreceptor drum to expose a layer definition on the photoreceptor drum outer surface, the controller circuit simultaneously rotating a front charged powder roller and a rear charged powder roller in counter rotational directions, respectively synchronized with and counter to the front and rear rotational directions of the photoreceptor drum, thereby presenting a developed portion of charged powder onto the layer definition of the photoreceptor drum and subsequently transferring said developed portion onto the workpart as respective metal print layers; front and rear microwave emitters disposed inside the mobile housing for fusing the respective metal print layers; and front and rear induction coils disposed inside the mobile housing for heating the workpart.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic of a mirrored DME 3D printer as it moves in the rearward direction;

FIG. 2 is a schematic of a mirrored DME 3D printer as it moves in the frontward direction; and FIG. 3 is a schematic of an LED array DME 3D printer using light emitting diode arrays.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Referring to the drawings, FIGS. 1 and 2 show an exemplary embodiment of an additive manufacturing system 10, depicted as cross-section of a direct metal electrophotography machine (DME), for printing a three-dimensional part having a mobile housing 12 defining a front housing section 14 and rear housing section 16.

The exemplary additive manufacturing system 10 of FIGS. 1 and 2 includes a photoreceptor drum 18, having a drum outer surface 19, positioned within a mobile housing 12. Although the photoreceptor drum 18 is shown as being centrally disposed within the mobile housing 12, any suitable configuration can be utilized in accordance with the present description.

The mobile housing 12 is positioned adjacent to a workpart 70, such that the drum outer surface 19 of the photoreceptor drum 18 is facing the printable surface 71 of the workpart 70. Generally, the workpart 70 is constructed from an electrically conducting material, such as a metal, so as to allow electrical biasing thereof. For example, the workpart 70 can be constructed of a metal alloy, including superalloys of aluminum, iron, nickel, titanium, cobalt, chromium or mixtures thereof.

A charging electrode 40 is positioned to apply electrostatic charge to the outer surface 19 of the photoreceptor drum 18 during an additive manufacturing process. Although shown as being centrally located within the housing 12 on the opposite side of the photoreceptor drum 18 from the workpart 70, the charging electrode 40 can be positioned in any suitable location within the housing 12 in accordance with the present disclosure. Generally, the charging electrode 40 projects an electrostatic charge onto the outer surface 19 of the photoreceptor drum 18 and/or any other revolving photosensitive drums or belts which are capable of holding an electrostatic charge on its surface. Thus, during printing, the outer surface 19 of the photoreceptor drum 18 is electrostatically charged after rotating by the charging electrode 40. Generally, the charging electrode 40 has a length that is at least as long as the length of the photoreceptor drum 18 so as to charge the entire outer surface 19 of the photoreceptor drum 18. In one embodiment, the charging electrode 40 is a corona wire positioned parallel to the axis of the photoreceptor drum 18 to project an electrostatic charge thereon. It is noted that this process can be operated in the absence of light (i.e., without any lighting within the housing 12).

An AC bias is also applied to the photoreceptor drum 18 to remove any residual charges left by previous layers. The photoreceptor drum 18 also has a DC bias, applied from the charging electrode 40, on the drum surface 19 to ensure a uniform negative potential thereon.

The photoreceptor drum outer surface 19 can have a silicon coating with the photoconductive layer having three layers including, from the outermost inward, a Charge Transport Layer (CTL), Charge Generation Layer (CGL), and barrier or oxidizing layer formed on the underlying aluminum substrate. The CTL is a clear layer approximately 20 microns thick, which allows light to pass through to the CGL and controls charge acceptance to the photoreceptor drum outer surface 19. The CGL is about 0.1 to 1 micron thick and allows the flow of ions. The barrier layer bonds the photoconductive layer to the aluminum substrate.

A laterally stationary platform 72 is disposed outside the mobile housing 12 adjacent the workpart 70, and can have at least one charged transfer electrode 74 in electrical communication with the laterally stationary platform 72. The photoreceptor drum 18 passes near the workpart 70, which is positively charged by transfer electrodes 74 on the back side of the platform 72, to pull the powder particles from the photoreceptor drum 18 to the workpart 70 and form a print layer 66, 68 according to the pattern on the outer surface 19.

A controller circuit 56 performs multiple operations for the exemplary embodiment. The controller circuit 56 can provide motion commands for traversing the mobile housing 12 about the workpart 70 to position the DME 10 in accordance with a data stream from a print file (e.g., from a user's computer and/or other controller). The controller circuit 56 can also selectively reflect at least one laser diode 54 emission onto the photoreceptor drum 18 to expose a layer definition portion 51 of the outer surface 19 while the photoreceptor drum 18 rotates in opposing front and rear rotational directions. The laser diode(s) 54 can be directed to rotating polygonal scanning mirrors 48, 50, that direct the laser beam 55 through a system of lenses and mirrors onto the photoreceptor drum 18. The photoreceptor drum 18 continues to rotate during the sweep and the angle of sweep compensates for this motion. A stream of model data from the controller circuit 56 turns the laser on and off to selectively irradiate the photoreceptor drum 18 surface 19 in those areas that do not correspond with the build layer cross section. Interaction of the laser 55 radiation with the photo reactive surface 19 enables local photoconductivity of the drum and permits surface static discharge of the areas where transfer of powder to the build layer is not desired. This process retains static charge of the drum surface 19 in those areas corresponding to the build cross section so that it may be subsequently used to lift and transfer powder to the drum surface 19 for application onto the workpart 70 as a build layer 68.

As shown in FIG. 3, exposure can also be performed using a front light emitting diode (LED) array 76 and rear light emitting diode (LED) array 78 spanning the width of the photoreceptor drum 18, each array being controlled by the controller circuit 56.

The controller circuit 56 also simultaneously rotates a front charged powder roller 20 and a rear charged powder roller 22 in counter rotational directions, respectively synchronized with and counter to the front and rear rotational directions of the photoreceptor drum 18, thereby presenting a developed portion of charged powder onto the layer definition of the photoreceptor drum 18 and subsequently transferring the developed portion onto the workpart 70 as respective metal print layers 66, 68. The photoreceptor drum outer surface 19 with the layer definition is exposed to powder particles from the front and rear powder feed 28, 30 depending on the rotational direction of the photoreceptor drum 18. The powder particles are given a negative charge, and are electrostatically attracted to the photoreceptor drum layer definition, i.e. the areas touched by the laser. Because like charges repel, the negatively charged powder will not attach to the drum where the negative charge remains. The front and rear powder rollers 20, 22 can also apply a DC bias on the photoreceptor drum outer surface 19 to ensure a uniform negative potential.

The front and rear powder cartridges 28, 30 can include metal materials, such as superalloys of aluminum, iron, nickel, titanium, cobalt, chromium or mixtures thereof, for formation and depositing of metal print layers 66, 68 of the same composition.

The controller circuit 56 also can control fusing operations of front and rear microwave emitters 58, 60 disposed inside the mobile housing 12, for fusing the respective metal print layers 66, 68 to the workpart 70. Additionally, the controller circuit 56 can control operation of front and rear induction coils 62, 64 disposed inside the mobile housing, for heating the workpart using thermal radiation, though any suitable heat supply can be utilized. During forward direction motion (see FIG. 2) of the mobile housing 12, front microwave emitters 58 and/or front induction coils 62 pre-heat the workpart 70 to prepare the surface for transferring the developed layer definition and acts to reduce the propensity of cracking and thermal distortion while rear microwave emitters 60 and/or rear induction coils 64 sinter the current developed layer definition to bind to the workpart 70. During rearward direction motion (see FIG. 1) of the mobile housing 12, the front and rear fusing operations of the microwave emitters and induction coils are reversed. The front and rear microwave emitters 58, 60 can operate at frequencies of about 100 MHz to about 300 GHz, or any frequency suitable for coupling with the powder and/or workpart 70. That is, the microwave emitters 58, 60 can emit electromagnetic radiation having a wavelength of about 100 MHz to about 300 GHz.

The controller circuit 56 may include suitable computer-readable instructions that, when implemented, configure the controller circuit 56 to perform various different functions, such as receiving, transmitting and/or executing control signals using computer logic.

A computer generally includes a processor(s) and a memory. The processor(s) can be any known processing device. Memory can include any suitable computer-readable medium or media, including, but not limited to, RAM, ROM, hard drives, flash drives, or other memory devices. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory can also include data that may be retrieved, manipulated, or stored by processor(s). For instance, after receiving the DME 10 layer definition, memory can store the information. Additionally, memory can store parameters for various other sources.

The computing device can include a network interface for accessing information over a network. The network can include a combination of networks, such as Wi-Fi network, LAN, WAN, the Internet, cellular network, and/or other suitable network and can include any number of wired or wireless communication links. For instance, the computing device could communicate through a wired or wireless network with the DME 10.

A cleaning operation of the DME 10 additive manufacturing system can include front and rear powder skimmers 36, 38 disposed adjacent the front and rear charged powder rollers 20, 22 for cleaning excess powder from the photoreceptor drum 18. The front and rear powder skimmers 36, 38 can also include front and rear adjustable layer cutting blades 32, 34. When the layer is complete, the electrically neutral adjustable layer cutting blades 32, 34 clean any excess powder from the photoreceptor drum 18 and deposits the powder back into the respective powder cartridge 28, 30. For printing subsequent layers, the laterally stationary platform 72 drops by the layer thickness blade setting on the adjustable layer cutting blades 32, 34 and the mobile print head housing 12 begins to traverse in the opposite direction for the next layer. This operation repeats until the workpart is complete.

Additional structures in the DME 10 front housing section 14 can include at least one fixed mirror 46 and at least one front scanning mirror 48 for reflection of the laser beam, and at least one front discharge lamp 42 for discharging the photoreceptor drum outer surface 19. Additional structures in the DME 10 rear housing section 16 can include at least one side selector mirror 52 and at least one rear scanning mirror 50 for reflection of the laser beam, and at least one rear discharge lamp 44 for discharging the photoreceptor drum outer surface 19.

The DME 10 additive manufacturing system is sizeable to any length without affecting functionality and multiple print heads can installed in a single mobile housing 12. Multiple mobile housings 12 can be used to build the same part on a single workpart 70.

The DME 10 additive manufacturing system deposits directly onto the workpart only the quantity and layers of build material required to build the part, with minimal waste. That is, after printing utilizing the DME 10 additive manufacturing system, there is little-to-no excess powder to remove from the printed surface and very little post processing of the part.

The DME 10 additive manufacturing system also reduces and/or eliminates thermal stresses through the process via layerwise heating, and prints in two dimensions (2-D linear fusing). Thus, there is no need for thermal cycles to relieve stress in the workpart following printing using the DME 10 additive manufacturing system.

In one embodiment, a method for printing a three-dimensional part involves charging an outer surface of a rotating photoreceptor drum with an electrostatic charge; neutralizing the electrostatic charge on a portion of the outer surface of the rotating photoreceptor drum surface to form a layer definition corresponding to the neutralized portion; then transferring a plurality of charged metal powder particles onto the outer surface of the rotating photoreceptor drum corresponding to the neutralized portion; and transferring the charged metal powder particles from the outer surface of the rotating photoreceptor drum onto a workpart to form a metal print layer. The method can use a metal workpart positioned on an electrically charged, stationary platform wherein the rotating photoreceptor drum rolls over the workpart to transfer the charged metal powder particles from the outer surface of the rotating photoreceptor drum onto the workpart. Additionally, the method can involve fusing the metal print layer to the workpart using electromagnetic radiation having wavelengths of about 100 MHz to about 300 GHz. The printing method can also preheat the workpart, using thermal radiation for example, prior to transferring the charged metal powder particles from the outer surface of the rotating photoreceptor drum onto the workpart.

In one embodiment, the printing method can neutralize the electrostatic charge by exposing the rotating photoreceptor drum outer surface to a layer definition using at least one laser beam. The layer definition can be provided by a controller circuit. The charged metal powder particles can then be delivered from at least one charged powder roller onto the outer surface of the photoreceptor drum. Then, after delivering the charged metal powder particles to the outer surface of the photoreceptor drum, any excess powder can be cleaned from the outer surface of the photoreceptor drum using at least one electrically neutral adjustable powder skimmer blade, and then depositing the excess powder back into the at least one charged powder roller. Then, any remaining charge can be discharged from the photoreceptor drum outer surface using at least one discharge lamp and then re-charge the outer surface of the photoreceptor drum.

A method is also generally provided for printing a three-dimensional part, which involves positioning a metal workpart on a stationary platform; electrically charging the platform; preheating the metal workpart; rolling a rotating photoreceptor drum across the preheated metal workpart to transfer a plurality of charged metal powder particles from an outer surface of the rotating photoreceptor drum onto an outer surface of the workpart to form a metal print layer; and fusing the metal print layer to the workpart. In this method, the metal print layer can be fused to the workpart using electromagnetic radiation having wavelengths of about 100 MHz to about 300 GHz and the workpart can be preheated using thermal radiation. Additionally, this method can involve charging the outer surface of the rotating photoreceptor drum with an electrostatic charge; neutralizing the electrostatic charge on a portion of the outer surface of the rotating photoreceptor drum surface to form a layer definition corresponding to the neutralized portion; and developing the layer definition with charged metal powder particles such that the charged metal powder particles are positioned on the outer surface of the rotating photoreceptor drum corresponding to the neutralized portion. The electrostatic charge can be neutralized by exposing the rotating photoreceptor drum outer surface to a layer definition using at least one laser beam. The layer definition can be provided by a controller circuit.

In one embodiment of the method, the charged metal powder particles can be delivered from at least one charged powder roller onto the outer surface of the photoreceptor drum. After delivering the charged metal powder particles to the outer surface of the photoreceptor drum, excess powder can be cleaned from the outer surface of the photoreceptor drum using at least one electrically neutral adjustable powder skimmer blade and then depositing the excess powder back into the at least one charged powder roller.

In such an embodiment, the rotating photoreceptor drum is rolled across the preheated metal workpart in a first direction, then the rotating photoreceptor drum is rolled across the preheated metal workpart in a second direction to transfer a second plurality of charged metal powder particles from the outer surface of the rotating photoreceptor drum onto the outer surface of the workpart to form a second metal print layer, then the second metal print layer is fused onto the workpart.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing system for printing a three-dimensional part, the additive manufacturing system comprising:
    a mobile housing defining a front housing section and rear housing section;
    a photoreceptor drum defining a drum outer surface;
    a charging electrode positioned to apply electrostatic charge to the photoreceptor drum outer surface;
    a laterally stationary platform disposed outside the mobile housing adjacent a workpart, the laterally stationary platform comprising at least one charged transfer electrode;
    a controller circuit for traversing the mobile housing about the workpart while selectively applying at least one laser diode emission onto the photoreceptor drum to expose a layer definition on the photoreceptor drum outer surface, the controller circuit simultaneously rotating a front charged powder roller and a rear charged powder roller in counter rotational directions, respectively synchronized with and counter to the front and rear rotational directions of the photoreceptor drum, thereby presenting a developed portion of charged powder onto the layer definition of the photoreceptor drum and subsequently transferring said developed portion onto the workpart as respective metal print layers;
    front and rear microwave emitters disposed inside the mobile housing for fusing the respective metal print layers; and
    front and rear induction coils disposed inside the mobile housing for heating the workpart.

2. The additive manufacturing system of claim 1, wherein the front housing section comprises a front powder skimmer disposed adjacent the front charged powder roller for cleaning excess powder.

3. The additive manufacturing system of claim 2, wherein the front powder skimmer comprises a front adjustable layer cutting blade.

4. The additive manufacturing system of claim 1, wherein the front housing section comprises at least one fixed mirror and at least one front scanning mirror.

5. The additive manufacturing system of claim 1, wherein the front housing section comprises at least one front discharge lamp for discharging the photoreceptor outer surface.

6. The additive manufacturing system of claim 1, wherein the rear housing section comprises a rear powder skimmer disposed adjacent the rear charged powder roller for cleaning excess powder.

7. The additive manufacturing system of claim 6, wherein the rear powder skimmer comprises a rear adjustable layer cutting blade.

8. The additive manufacturing system of claim 1, wherein the rear housing section comprises at least one side selector mirror and at least one rear scanning mirror.

9. The additive manufacturing system of claim 1, wherein the rear housing section comprises at least one rear discharge lamp for discharging the photoreceptor outer surface.

10. The additive manufacturing system of claim 1, wherein the front and rear microwave emitters operate at a frequency in the range of about 100 MHz to 100 GHz.

11. The additive manufacturing system of claim 1, wherein the metal print layers comprise superalloys of aluminum, iron, nickel, titanium, cobalt, chromium, or mixtures thereof.

12. An additive manufacturing system for printing a three-dimensional part, the additive manufacturing system comprising:
    a mobile housing defining a front housing section and rear housing section;
    a photoreceptor drum defining a drum outer surface, the photoreceptor drum centrally disposed in the mobile housing adjacent a workpart;
    a charging electrode centrally disposed in the mobile housing to apply electrostatic charge to the photoreceptor drum outer surface;

a laterally stationary platform disposed outside the mobile housing adjacent the workpart, the laterally stationary platform comprising at least one charged transfer electrode;

a controller circuit for traversing the mobile housing about the workpart while selectively energizing and directing at least one laser diode in a laser diode array onto the photoreceptor drum to expose a layer definition on the photoreceptor drum outer surface while the photoreceptor drum rotates in opposing front and rear rotational directions, the controller circuit simultaneously rotating a front charged powder roller and a rear charged powder roller in counter rotational directions, respectively, synchronized with and counter to the front and rear rotational directions of the photoreceptor drum, thereby producing a developed portion of charged powder onto the layer definition of the photoreceptor drum and subsequently transferring said developed portion onto the workpart as respective print layers;

front and rear microwave emitters disposed inside the mobile housing for fusing the respective print layers, and front and rear induction coils disposed inside the mobile housing for heating the workpart.

13. The additive manufacturing system of claim 12, wherein the front housing section comprises a front powder skimmer disposed adjacent the front charged powder roller for cleaning excess powder.

14. The additive manufacturing system of claim 13, wherein the front powder skimmer comprises a front adjustable layer cutting blade.

15. The additive manufacturing system of claim 12, wherein the front housing section comprises at least one front discharge lamp for discharging the photoreceptor outer surface.

16. The additive manufacturing system of claim 12, wherein the rear housing section comprises a rear powder skimmer disposed adjacent the rear charged powder roller for cleaning excess powder, said rear powder skimmer comprising a rear adjustable layer cutting blade.

17. The additive manufacturing system of claim 12, wherein the rear housing section comprises at least one rear discharge lamp for discharging the photoreceptor outer surface.

18. The additive manufacturing system of claim 12, wherein the front and rear microwave emitters operate at a frequency in the range of about 100 MHz to 100 GHz.

19. The additive manufacturing system of claim 12, wherein the metal print layers comprise superalloys of aluminum, iron, nickel, titanium, cobalt, chromium, or mixtures thereof.

* * * * *